United States Patent
Yamada

(10) Patent No.: US 9,985,780 B2
(45) Date of Patent: May 29, 2018

(54) HASH VALUE GENERATING DEVICE THAT PERFORMS ROUND PROCESSING OF A HASH ALGORITHM

(71) Applicant: CANON KABUSHIKI KAISHA, Tokyo (JP)

(72) Inventor: Shinya Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 268 days.

(21) Appl. No.: 14/767,896

(22) PCT Filed: Feb. 17, 2014

(86) PCT No.: PCT/JP2014/054245
§ 371 (c)(1),
(2) Date: Aug. 13, 2015

(87) PCT Pub. No.: WO2014/129610
PCT Pub. Date: Aug. 28, 2014

(65) Prior Publication Data
US 2015/0381354 A1  Dec. 31, 2015

(30) Foreign Application Priority Data
Feb. 21, 2013 (JP) ................ 2013-032036
Jan. 31, 2014 (JP) ................ 2014-017414

(51) Int. Cl.
*H04L 9/06* (2006.01)
*G09C 1/00* (2006.01)

(52) U.S. Cl.
CPC ............. *H04L 9/0643* (2013.01); *G09C 1/00* (2013.01); *H04L 2209/125* (2013.01)

(58) Field of Classification Search
USPC ...................................................... 713/189
See application file for complete search history.

(56) References Cited

U.S. PATENT DOCUMENTS 7,489,779 B2  2/2009  Scheuermann
7,490,065 B1  2/2009  Ogg et al.
(Continued)

FOREIGN PATENT DOCUMENTS

CN  101617351 A  12/2009
CN  101872338 A  10/2010
(Continued)

OTHER PUBLICATIONS

International Search Report and Written Opinion for PCT/JP2014/054246 and notification of transmittal of the ISR/WO, dated May 13, 2014.
(Continued)

*Primary Examiner* — William J. Goodchild
(74) *Attorney, Agent, or Firm* — Canon USA, Inc. I.P. Division

(57) ABSTRACT

A hash value generating device for generating a hash value based on the KECCAK algorithm includes a θ processing unit, a ρ processing unit, a π processing unit, a χ processing unit, and an ι processing unit for performing processing of five steps θ, ρ, π, χ, and ι, included in round processing of the KECCAK algorithm. The θ processing unit includes a θ1 processing unit for performing column sum calculation processing and a θ2 processing unit for performing column sum addition processing. In the round processing, the π processing unit performs processing before the θ2 processing unit and the ρ processing unit performs processing, and the ρ processing unit performs processing on a lane after rearrangement processing by the π processing unit.

14 Claims, 17 Drawing Sheets

(56) References Cited

U.S. PATENT DOCUMENTS

| | | |
|---|---|---|
| 2002/0191791 A1 | 12/2002 | Anand |
| 2009/0262925 A1 | 10/2009 | Vijayarangan |
| 2011/0040977 A1 | 2/2011 | Farrugia et al. |
| 2011/0138192 A1 | 6/2011 | Kocher et al. |
| 2011/0273334 A1 | 11/2011 | Karr |
| 2012/0057702 A1 | 3/2012 | Minematsu |
| 2013/0275722 A1* | 10/2013 | Yap ............... G06F 9/30145 712/208 |
| 2014/0016773 A1 | 1/2014 | Wolrich et al. |
| 2016/0013932 A1 | 1/2016 | Karaki et al. |

FOREIGN PATENT DOCUMENTS

| | | |
|---|---|---|
| JP | H04-148372 A | 5/1992 |
| JP | 2010-258993 A | 11/2010 |
| JP | 2011-133916 A | 7/2011 |
| KR | 10-2009-0094086 A | 9/2009 |
| WO | 2013/089682 A1 | 6/2013 |

OTHER PUBLICATIONS

Kavun, et al., "A Lightweight Implementation of Keccak Hash Function for Radio-Frequency Identification Applications", Lecure Notes in Computer Science, vol. 6370, Jun. 2010, pp. 258-269. (The year of publiction for this reference is sufficiently earlier than the effective U.S. filing date and any foreigh priority date so that the particular month of publication is not in issue.).

San, et al., "Compact Keccak Hardware Architecure for Data Integrity and Authentication of FPGAs", Information Security Journal: A Global Perspective, vol. 21 No. 5, Aug. 2012, pp. 231-242. (The year of publiction for this reference is sufficiently earlier than the effective U.S. filing date and any foreign priority date so that the particular month of publication is not in issue.).

Jungk, et al. "Area-efficient FPGA Implementations of the SHA-3 Finalists", 2011 International Conference on econfigurable Computing and FPGAs, Date of Conference: 2011 (The year of publication for this reference is ufficiently earlier than the effective U.S. filed and any foreign priority date so that the particular month of ublication is not in issue.).

Bertoni, et al., "KECCAK implementation overview", Version 3.1, Sep. 5, 2011, (http://keccak.noekeon.org/files.html).

San, et al., "Compact Keccak Hardware Architecture for Data Integrity and Authentication on FPGAs", Information Security Journal: A Global Perspective, vol. 21, No. 5, pp. 231-242, Aug. 16, 2012.

Pereira, et al., "Exploiting Parallelism on Keccak: FPGA and GPU Comparison", Parallel & Cloud Computing, vol. 2, Issue 1, pp. 1-6, Jan. 2013.

Kavun, et al., "A Lightweight Implementation of Keccak Hash Function for Radio-Frequency Identification Applications", Lecure Notes in Computer Science, vol. 6370, 2010, pp. 258-269.

Bertoni, et al., "KECCAK implementation overview", Version 3.2, May 29, 2012, (http://keccak.noekeon.org/files.html).

Kerckhof, et al., "Compact FPGA Implementations of the Five SHA-3 Finalists", Lecture Notes in Computer Science, vol. 7079, Sep. 2011, pp. 217-233.

Kaps, et al., "Lightweight Implementations of SHA-3 Candidates on FPGAs", Lecture Notes in Computer Science, vol. 7107, Dec. 2011, pp. 270-289.

San, et al., "Compact Keccak Hardware Architecure for Data Integrity and Authentication on FPGAs", Information Security Journal: A Global Perspective, vol. 21 No. 5, 2012, pp. 231-242.

Latif, et al., "Novel Arithmetic Architecture for High Performance Implementation of SHA-3 Finalist Keccak on FPGA Platforms", Lecture Notes in Computer Science, vol. 7199, Mar. 2012, pp. 372-378.

Bertoni, et al., "The KECCAK reference", Version 3.0, Jan. 14, 2011, (http://keccak.noekeon.org/Keccak-reference-3.0.pdf).

International Search Report and Written Opinion for PCT/JP2014/054245 and notification of transmittal of the ISR/WO, dated May 13, 2014.

Alshaikhli et al., "Comparison and Analysis Study of SHA-3 Finalists", 2012 International Conference on Advanced Computer Science Applications and Technologies, pp. 366-371, Nov. 2012.

* cited by examiner

[Fig. 1A]
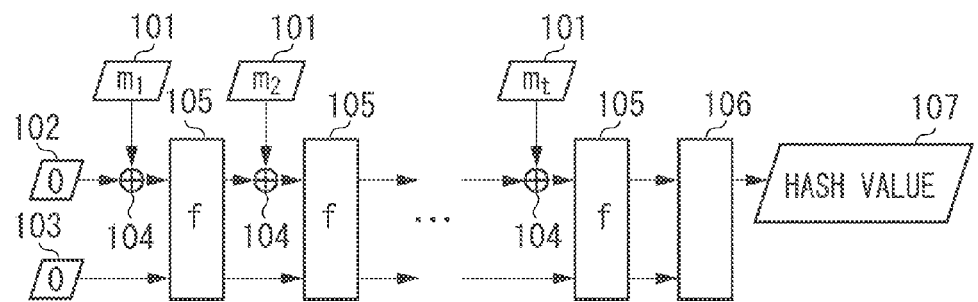
[Fig. 1B]
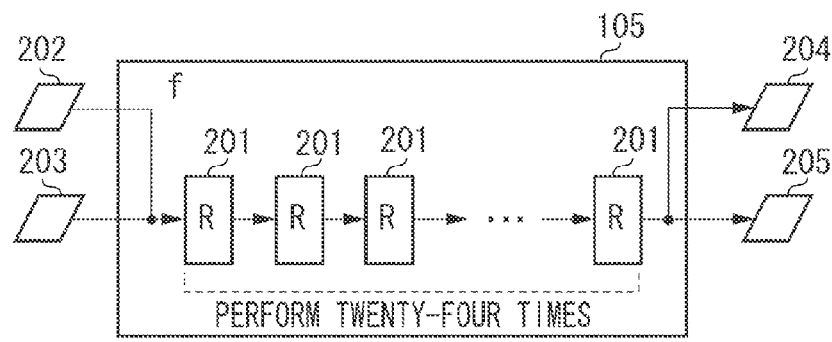
[Fig. 1C]
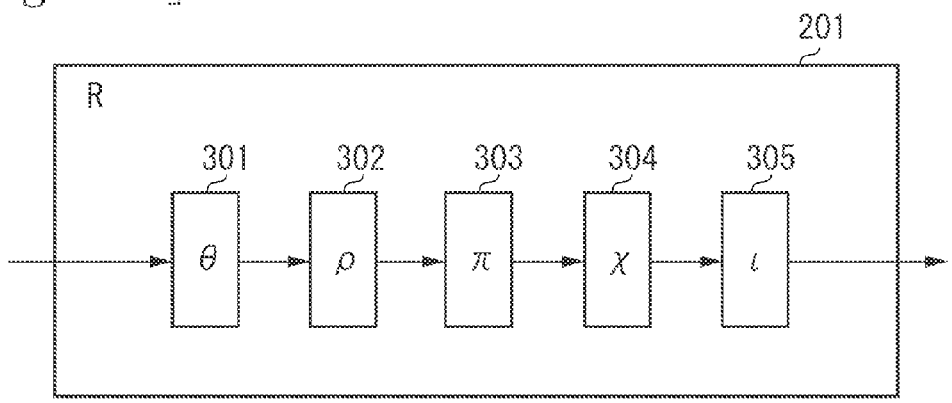

[Fig. 2A]
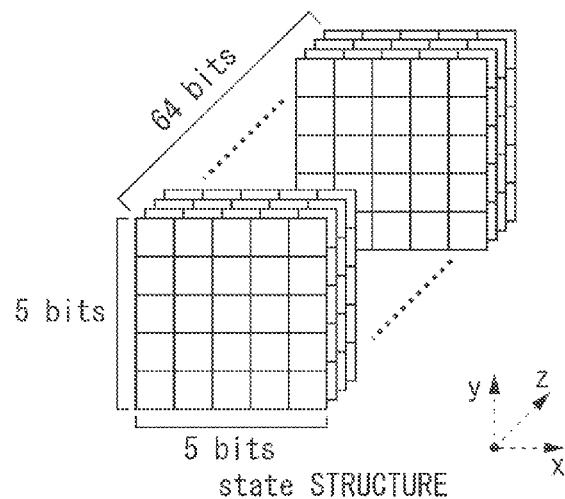
state STRUCTURE
[Fig. 2B]
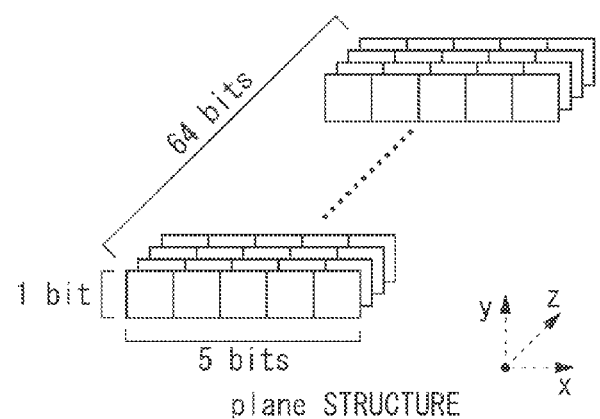
plane STRUCTURE
[Fig. 2C]
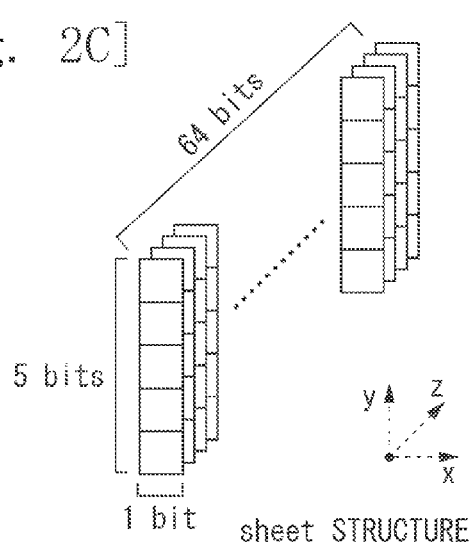
sheet STRUCTURE

[Fig. 2D]
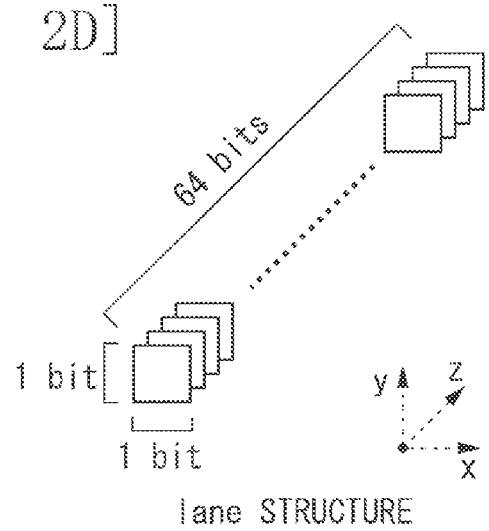
lane STRUCTURE
[Fig. 2E]
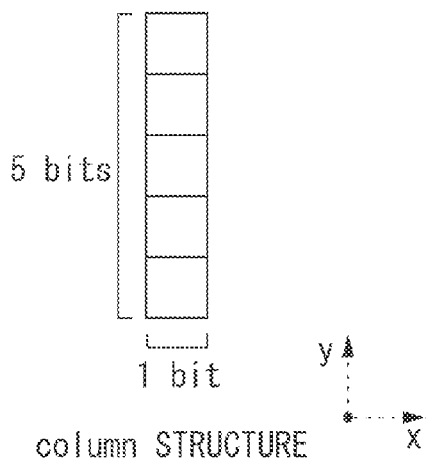
column STRUCTURE
[Fig. 2F]
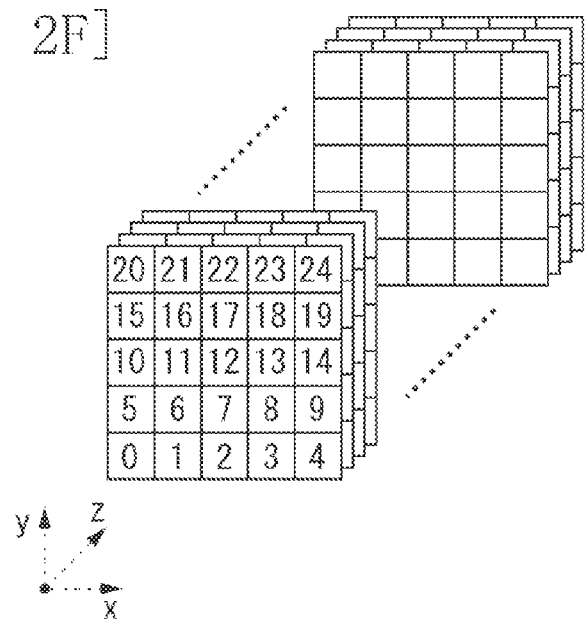

[Fig. 3A]
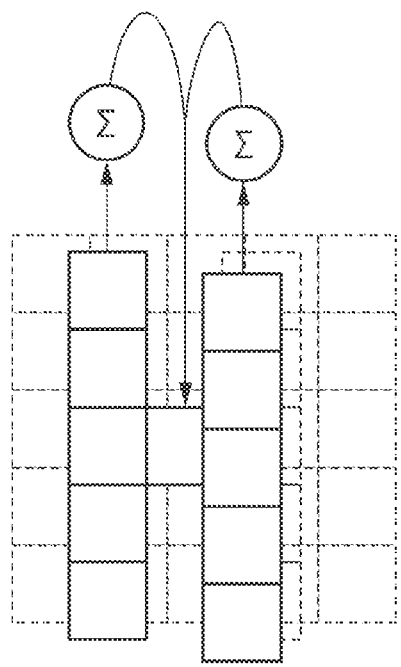
STEP θ
[Fig. 3B]
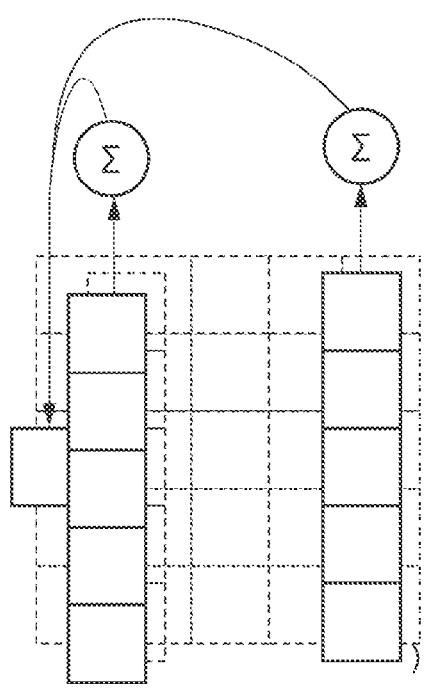
STEP θ
(UPON CALCULATION OF BIT AT X = 0)

[Fig. 4A]
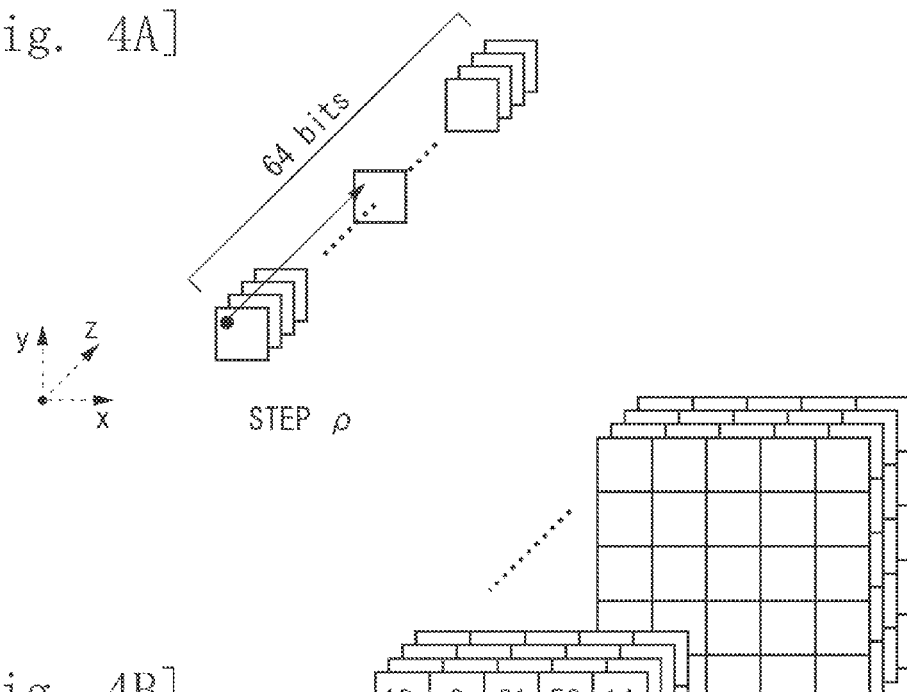
STEP ρ
[Fig. 4B]
SHIFTING AMOUNTS
FOR RESPECTIVE lanes
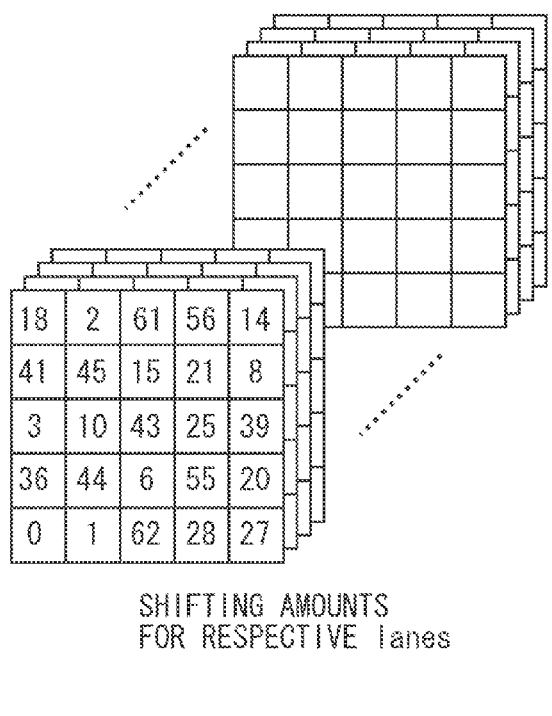
[Fig. 4C]
| 18 | 2 | 61 | 56 | 14 |
| 41 | 45 | 15 | 21 | 8 |
| 3 | 10 | 43 | 25 | 39 |
| 36 | 44 | 6 | 55 | 20 |
| 0 | 1 | 62 | 28 | 27 |

[Fig. 5A]
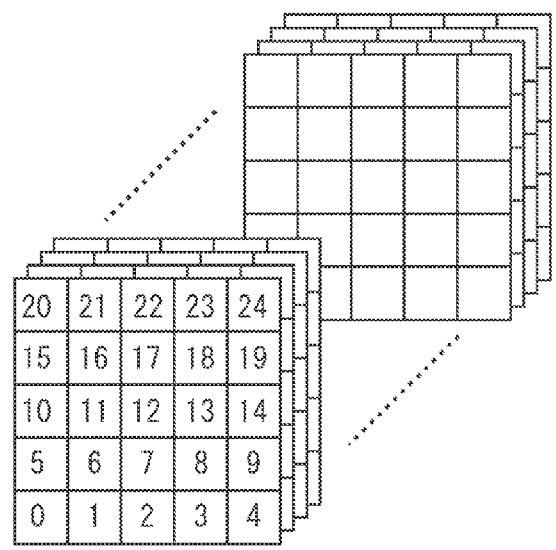
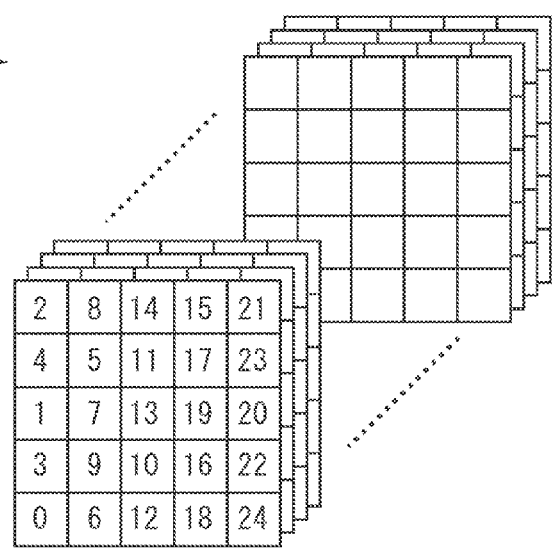
STEP π
[Fig. 5B]
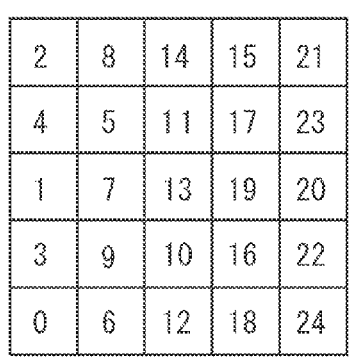

[Fig. 6]
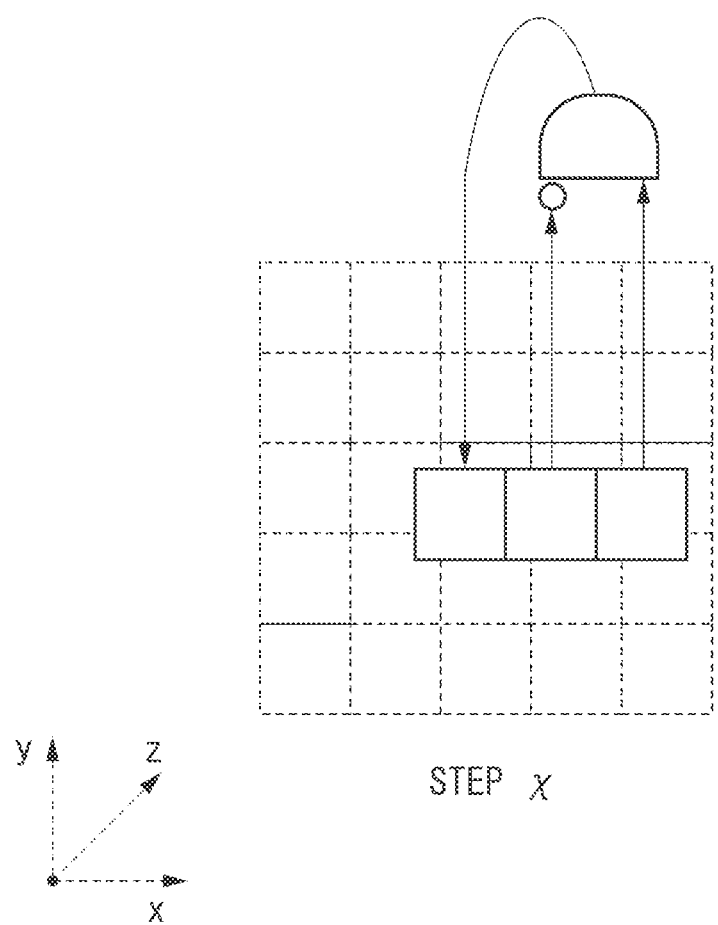
STEP χ

[Fig. 7]
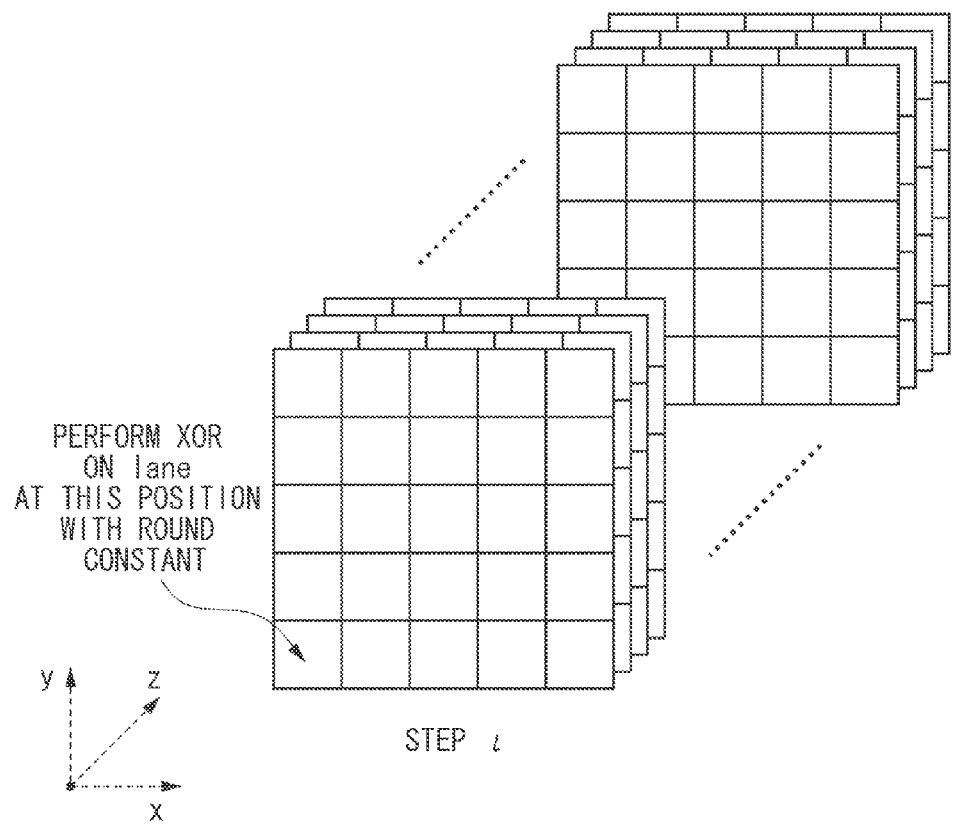

[Fig. 8]

| NUMBER OF TIMES OF ROUND | ROUND CONSTANT |
|---|---|
| 1 | 0x0000000000000001 |
| 2 | 0x0000000000008082 |
| 3 | 0x800000000000808A |
| 4 | 0x8000000080008000 |
| 5 | 0x000000000000808B |
| 6 | 0x0000000080000001 |
| 7 | 0x8000000080008081 |
| 8 | 0x8000000000008009 |
| 9 | 0x000000000000008A |
| 10 | 0x0000000000000088 |
| 11 | 0x0000000080008009 |
| 12 | 0x000000008000000A |
| 13 | 0x000000008000808B |
| 14 | 0x800000000000008B |
| 15 | 0x8000000000008089 |
| 16 | 0x8000000000008003 |
| 17 | 0x8000000000008002 |
| 18 | 0x8000000000000080 |
| 19 | 0x800000000000800A |
| 20 | 0x800000008000000A |
| 21 | 0x8000000080008081 |
| 22 | 0x8000000000008080 |
| 23 | 0x0000000080000001 |
| 24 | 0x8000000080008008 |

[Fig. 9A]
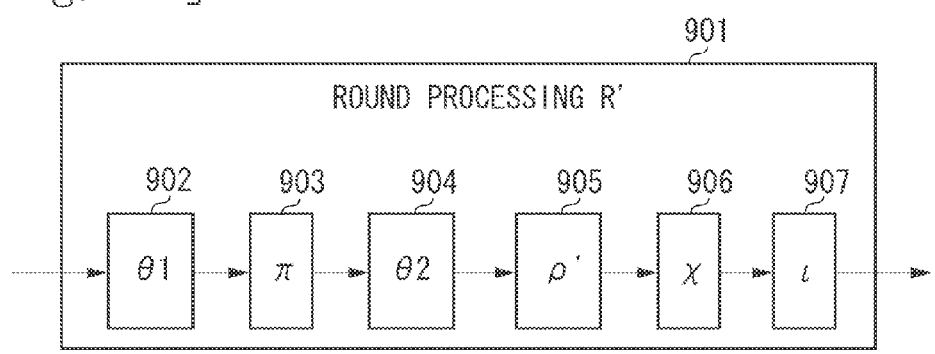
[Fig. 9B]
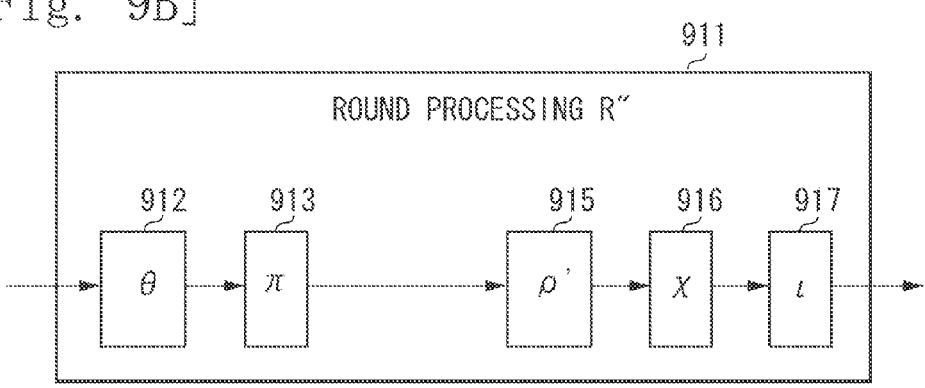

[Fig. 10A]
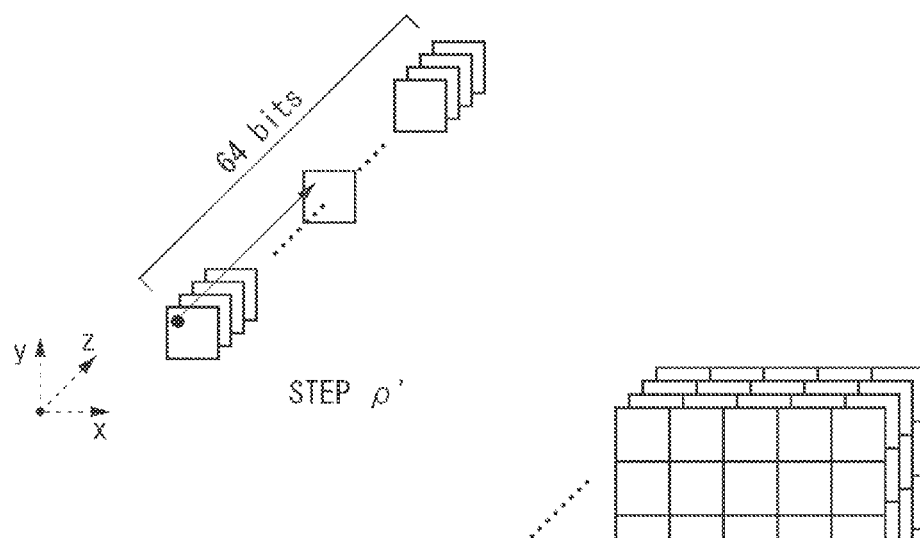
STEP ρ'
[Fig. 10B]
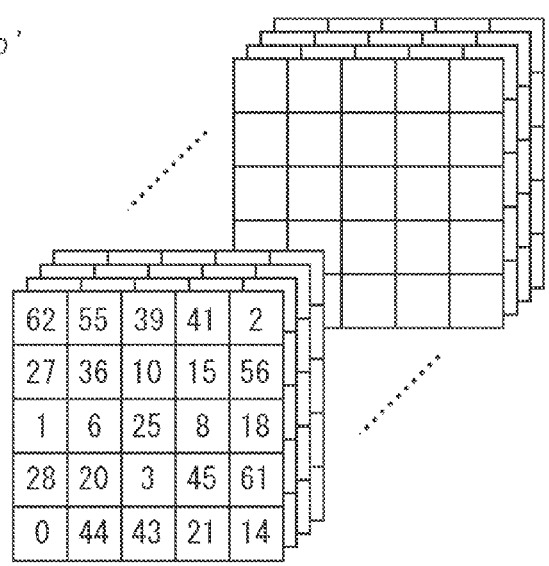
SHIFTING AMOUNTS
[Fig. 10C]
| 62 | 55 | 39 | 41 | 2  |
|----|----|----|----|----|
| 27 | 36 | 10 | 15 | 56 |
| 1  | 6  | 25 | 8  | 18 |
| 28 | 20 | 3  | 45 | 61 |
| 0  | 44 | 43 | 21 | 14 |

[Fig. 11]
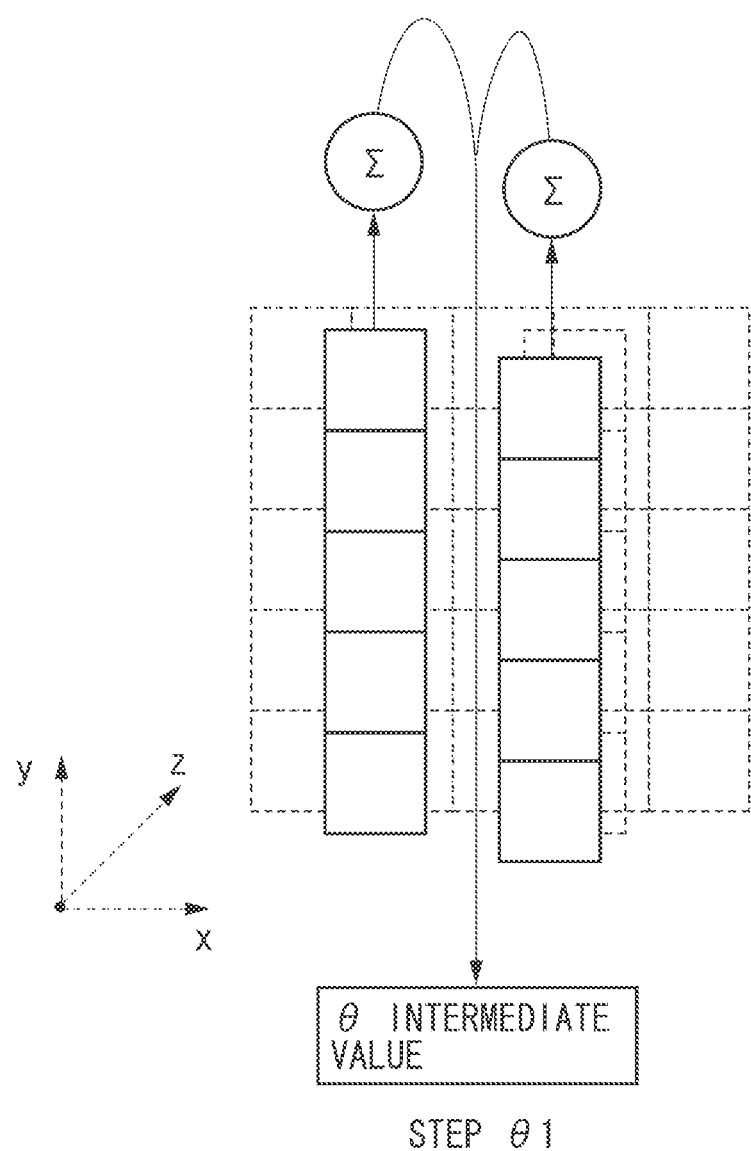

[Fig. 12A]
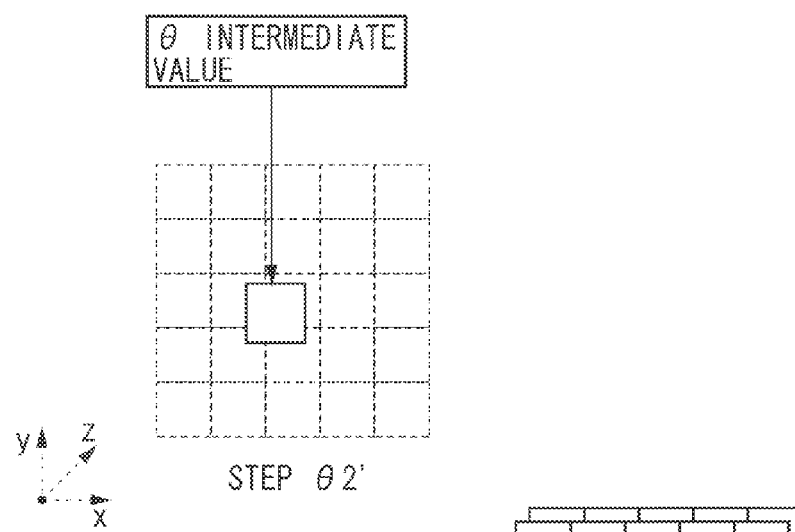
[Fig. 12B]
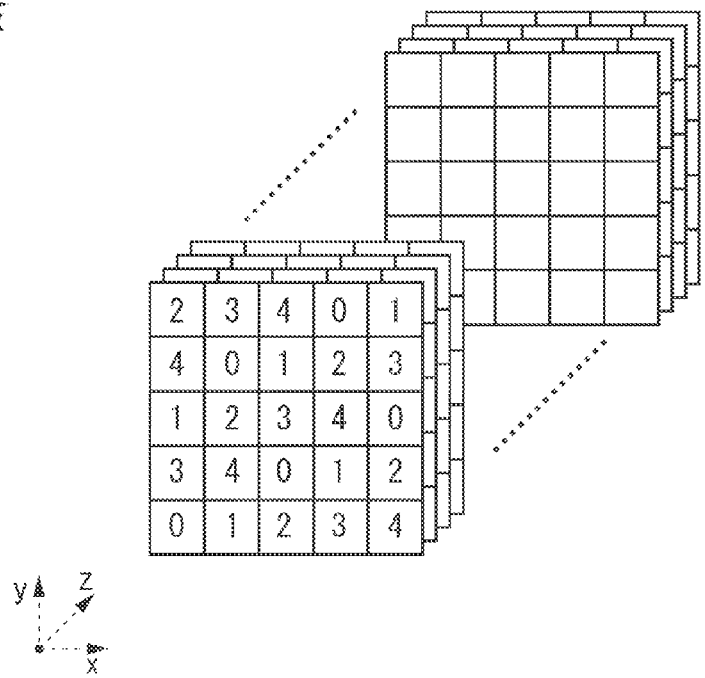
[Fig. 12C]

[Fig. 13]
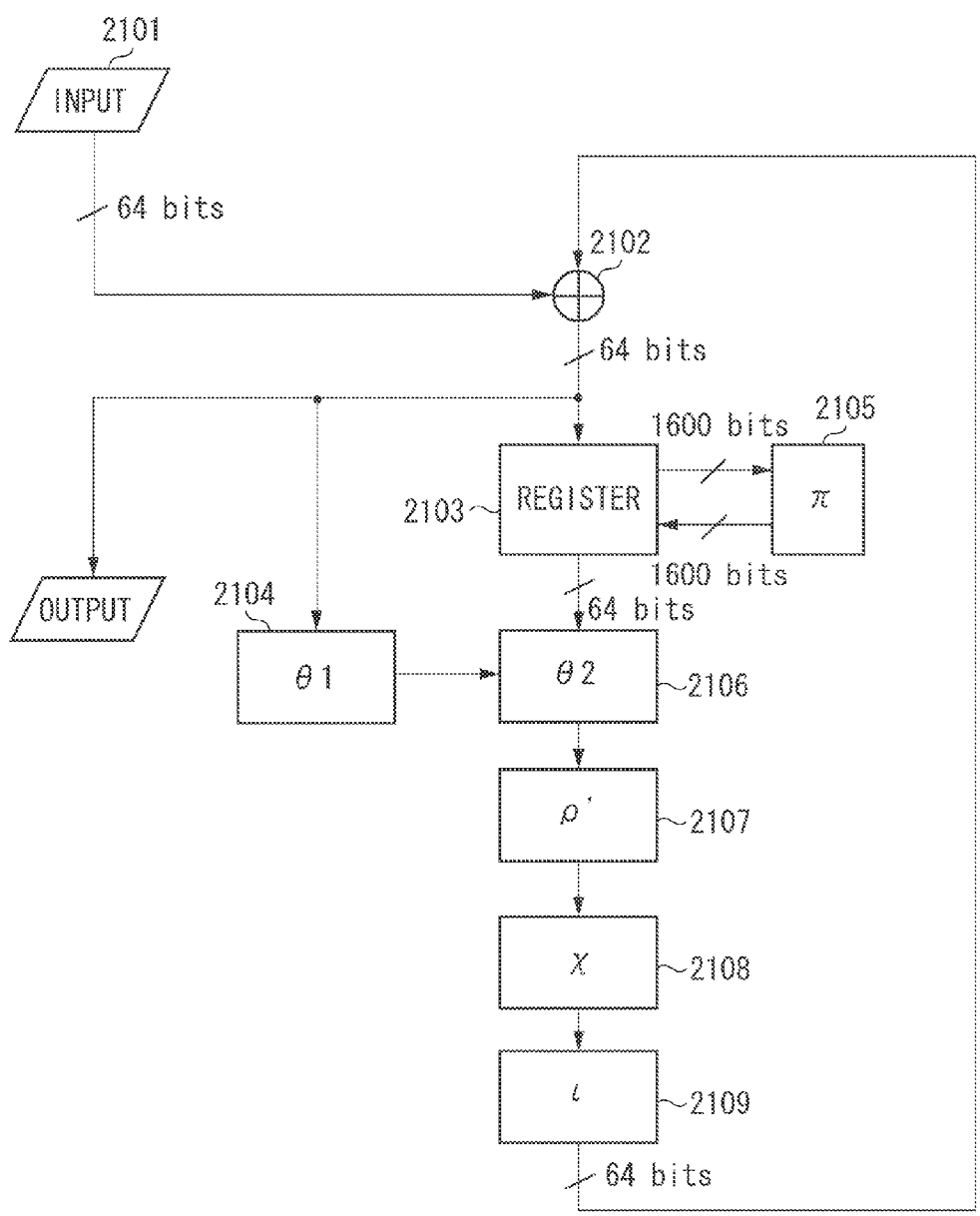

[Fig. 14A]
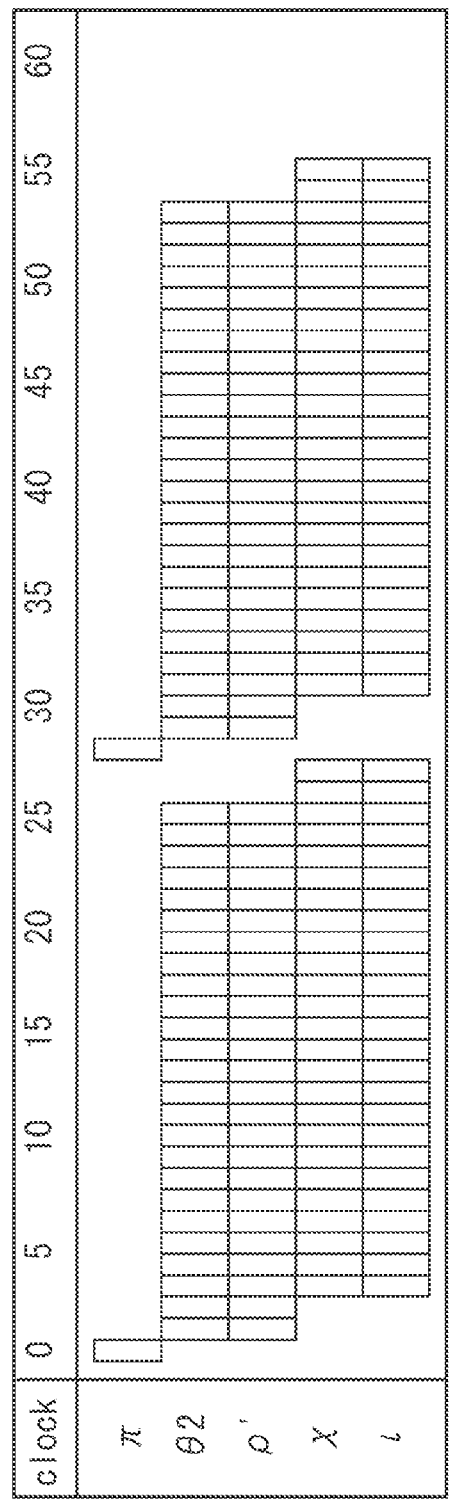

[Fig. 14B]
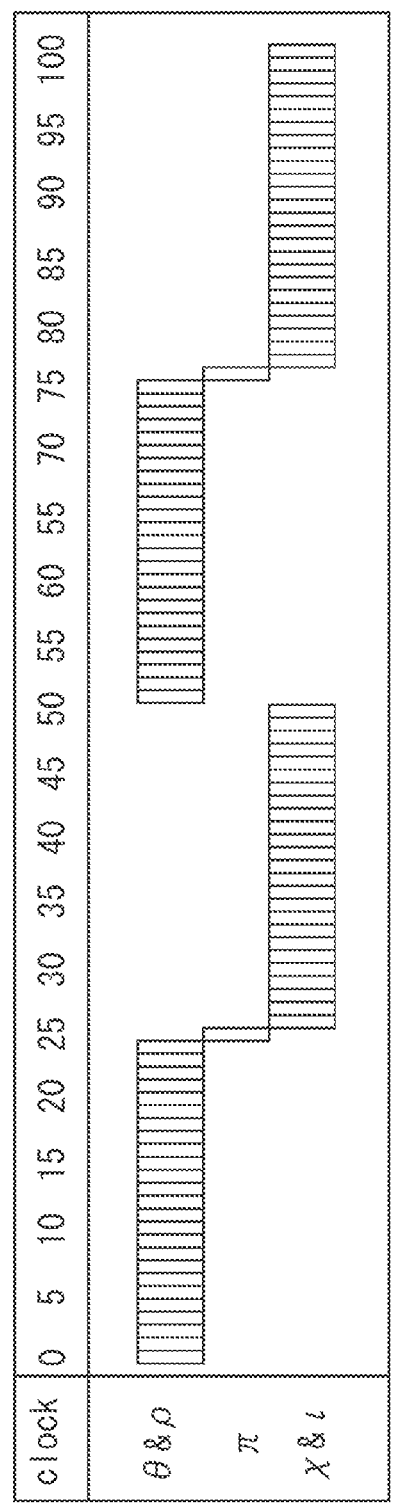

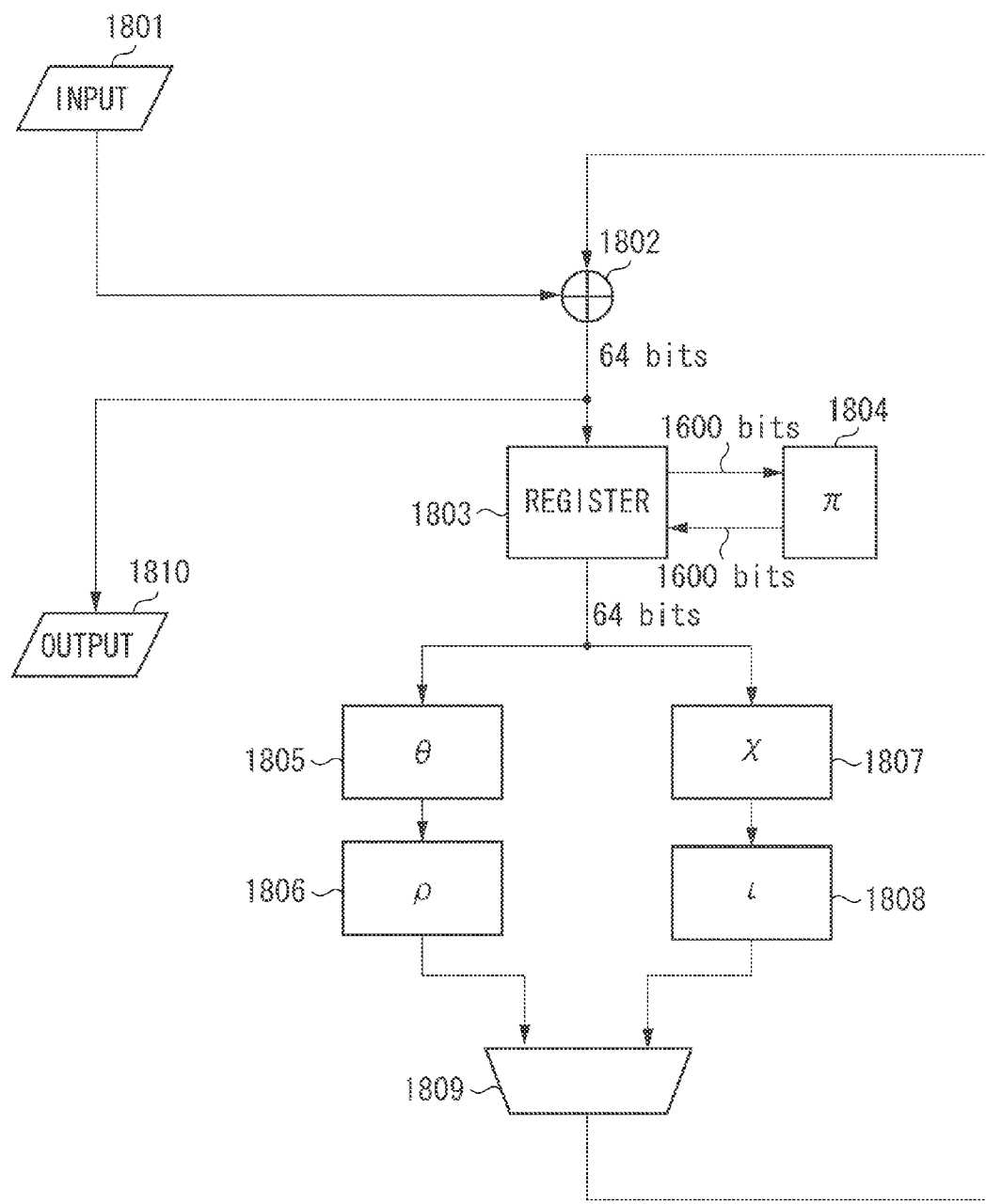
[Fig. 15]

US 9,985,780 B2

HASH VALUE GENERATING DEVICE THAT PERFORMS ROUND PROCESSING OF A HASH ALGORITHM

TECHNICAL FIELD

The present invention relates to technique for generating a hash value.

BACKGROUND ART

A hash value, which is calculated by using a cryptographic hash algorithm, is utilized for checking data alteration. It has been already verified that Secure Hash Algorithm 1 (SHA-1), which is a cryptographic hash algorithm (cryptographic hash), is not capable of securing safety. It has been pointed out that SHA-2 family (SHA-224, SHA-256, SHA-384, and SHA-512) may lack security. Therefore, National Institute of Standards and Technology (NIST) asked the public to come up with a new algorithm to establish a next-generation cryptographic hash algorithm (SHA-3). Then, the KECCAK algorithm ("The KECCAK reference", Version 3.0, Jan. 14, 2011, (http://keccak.noekeon.org/Keccak-reference-3.0.pdf)) was assigned as the SHA-3 in December 2012.

The SHA-3 outputs a cryptographic hash value of a fixed length from an input message (data) of any length. In the KECCAK algorithm, a permutation function is used, and in the permutation function, round processing of five sequential steps ($\theta$, $\rho$, $\pi$, $\chi$, and $\iota$) is repeated twenty-four times. The round processing is performed on data called a "state" data piece having a length of 1600 bits.

A lot of results of preceding processing has to be once stored in a memory for the $\theta$ processing and the $\pi$ processing out of the five steps of the round processing. Therefore, when the round processing is performed in the order of the steps $\theta$, $\rho$, $\pi$, $\chi$, and $\iota$, a lot of results of preceding processing has to be once stored in a memory twice within one-time round processing, and thus speedup has been difficult.

SUMMARY OF INVENTION

The present invention is directed to a technique to improve throughput for generating hash values.

According to an aspect of the present invention, a hash value generating device for generating a hash value based on KECCAK algorithm includes a $\theta$ processing means, a $\rho$ processing means, a $\pi$ processing means, a $\chi$ processing means, and an $\iota$ processing means for performing processing of five steps $\theta$, $\rho$, $\pi$, $\chi$, and $\iota$ included in round processing of the KECCAK algorithm, the $\theta$ processing means includes a $\theta 1$ processing means for performing column sum calculation processing and a $\theta 2$ processing means for performing column sum addition processing, in the round processing, the $\pi$ processing means performs processing before the $\theta 2$ processing means and the $\rho$ processing means perform processing, and the $\rho$ processing means performs processing on a lane on which rearrangement processing has been performed by the $\pi$ processing means.

Further features of the present invention will become apparent from the following description of exemplary embodiments with reference to the attached drawings.

BRIEF DESCRIPTION OF DRAWINGS

FIGS. 1A, 1B, and 1C are diagrams illustrating the KECCAK algorithm.

FIGS. 2A, 2B, 2C, 2D, 2E, and 2F are diagrams illustrating data structures.

FIGS. 3A and 3B are diagrams illustrating processing in step $\theta$.

FIGS. 4A, 4B, and 4C are diagrams illustrating processing in step $\rho$.

FIGS. 5A and 5B are diagrams illustrating processing in step $\pi$.

FIG. 6 is a diagram illustrating processing in step $\chi$.

FIG. 7 is a diagram illustrating processing in step $\iota$.

FIG. 8 is a diagram illustrating round constants in step $\iota$.

FIGS. 9A and 9B are diagrams illustrating an overview of round processing R'.

FIGS. 10A, 10B, and 10C are diagrams illustrating processing in step $\rho'$.

FIG. 11 is a diagram illustrating processing in step $\theta 1$.

FIGS. 12A, 12B, and 12C are diagrams illustrating processing in step $\theta 2$.

FIG. 13 is a diagram illustrating a schematic configuration of an implementation example of the KECCAK algorithm according to a first exemplary embodiment.

FIGS. 14A and 14B are output timing charts.

FIG. 15 is a diagram illustrating a schematic configuration of an implementation example when processing is performed on a lane as a unit by the KECCAK algorithm.

DESCRIPTION OF EMBODIMENTS

Various exemplary embodiments, features, and aspects of the invention will be described in detail below with reference to the drawings.

As a hash value generating device according to an exemplary embodiment of the present invention, a device configured to generate a hash value of SHA-3 (KECCAK algorithm) will be hereinafter described as an example. In the description below, a specific data length or a specific bit value may be provided, but the present invention is not limited to the specific length or value.

First, the KECCAK algorithm will be described. Note that, specifications in more detail can be found in "The KECCAK reference", Version 3.0, Jan. 14, 2011, (http://keccak.noekeon.org/Keccak-reference-3.0.pdf).

FIG. 1A is a diagram illustrating a whole of the KECCAK algorithm. In FIG. 1A, message blocks 101 ($m_1$ to $m_\ell$) are illustrated. The message blocks 101 ($m_1$ to $m_\ell$) are generated by dividing an input message, for which a hash value is generated, into units of 1024-bit blocks.

As illustrated in FIG. 1A, all bits of initial values 102 and 103 are zeros in the present exemplary embodiment. Here, an example where all bits of initial values are zeros is described as an example, but the present invention is not limited to this example. The length of the initial value 102 is 1024 bits, which is the same as that of the message blocks described above, and the total length of the initial values 102 and 103 is 1600 bits. A bitwise exclusive OR (XOR) operator 104 is also illustrated. That is, the XOR operator 104 calculates exclusive OR for each bit of the two 1024-bit input data pieces and outputs the results as a 1024-bit data piece.

A KECCAK-f 105, which is a permutation function, receives two input data pieces and outputs two data pieces. The detail of the KECCAK-f 105 will be described below with reference to FIG. 1B. A cut-out section 106 cuts out a necessary size from the 1024-bit input data pieces, and outputs the cut out data. A cryptographic hash value (i.e., hash value) 107 is calculation results of this algorithm.

FIG. 1B is a diagram illustrating an overview of the KECCAK-f 105, which is a permutation function. Round processing R 201 is performed twenty-four times. The detail of the round processing R will be described below. Input data pieces 202 and 203 are illustrated. The length of the input data piece 202 is 1024 bits. The total length of the input data pieces 202 and 203 is 1600 bits. The two input data pieces 202 and 203 are coupled and then input to the round processing R 201. Output data pieces 204 and 205 are illustrated. The length of the output data piece 204 is 1024 bits. The total length of the output data pieces 204 and 205 is 1600 bits.

FIG. 1C is a diagram illustrating an overview of the round processing R 201. As described above, for the round processing R 201, the lengths of the input data piece and the output data piece are both 1600 bits. In the round processing R 201, processing of five steps (θ processing unit 301, ρ processing unit 302, π processing unit 303, χ processing unit 304, and ι processing unit 305) to be described below is sequentially performed on the input data piece to generate the output data piece.

Data structures used in the round processing of the KECCAK algorithm and the above five steps will be described in detail below.

FIG. 2A is a diagram illustrating a "state", which is a data structure upon input/output of the round processing R 201. As described above, both of the input data piece and the output data piece have 1600-bit length. Each of these 1600-bit data pieces is expressed as a rectangular parallelepiped having a width (x axis direction) of five bits, a height (y axis direction) of five bits, and a depth (z axis direction) of sixty-four bits in three-dimensional arrangement. The rectangular parallelepiped data structure is called a "state". A 1600-bit data piece is allocated to the state structure expressed as a rectangular parallelepiped in the order of the z axis direction, the x axis direction, and the y axis direction. The detail will be described below with reference to FIG. 2F.

FIG. 2B is a diagram illustrating a data structure "plane". The plane structure is expressed as a planar structure that is parallel to the x-z plane and that has a width of five bits, a height of one bit, and a depth of sixty-four bits. That is, the above "state" structure can be considered as five plane structures that are stacked in the y axis direction.

FIG. 2C is a diagram illustrating a data structure "sheet". The sheet structure is expressed as a planar structure that is parallel to the y-z plane and that has a width of one bit, a height of five bits, and a depth of sixty-four bits. That is, the above "state" structure can be considered as five sheet structures arranged horizontally in line in the x axis direction.

FIG. 2D is a diagram illustrating a data structure "lane". The lane structure is expressed as a linear structure that is parallel to the z axis and that has a width of one bit, a height of one bit, and a depth of sixty-four bits. That is, the above "state" structure can be considered as twenty-five lane structures gathered along the x-y plane. FIG. 2F is a diagram illustrating the order of twenty-five lanes included in one state structure.

FIG. 2E is a diagram illustrating a data structure "column". The column structure is expressed as a linear structure that is parallel to the y axis and that has a width of one bit, a height of five bits, and a depth of one bit. That is, the above "sheet" structure can be considered as sixty-four column structures arranged in line in the z axis direction.

In the first exemplary embodiment, a case where the input data piece is 1600 bits are described, but the present invention is not limited to the case. In addition, an example where data of the state structure is handled as a rectangular parallelepiped data structure having a width (x axis direction) of five bits, a height (y axis direction) of five bits, and a depth (z axis direction) of sixty-four bits will be described, but the present invention is not limited thereto. For example, an input data piece may have 800 bits, and the state structure data may be handled as a rectangular parallelepiped data structure having a width of five bits, a height of five bits, and a depth of thirty-two bits.

Further, the plane structure, the sheet structure, the lane structure, and the column structure can be modified according to the respective numbers of bits in the width (x axis direction), in the height (y axis direction), and in the depth (z axis direction) of the state structure. More specifically, when the state structure data has m bits in the x axis direction, n bits in the y axis direction, and s bits in the z axis direction, the plane structure is a planar structure having m bits in the x axis direction, one bit in the y axis direction, and s bits in the z axis direction. The sheet structure is a planar structure having one bit in the x axis direction, n bits in the y axis direction, and s bits in the z axis direction. The lane structure is a linear structure having one bit in the x axis direction, one bit in the y axis direction, and s bits in the z axis direction. The column structure is a linear structure having one bit in the x axis direction, n bits in the y axis direction, and one bit in the z axis direction.

Next, a method of forming an input data piece for the first round processing R 201 from the input data pieces 202 and 203 that have been input to the KECCAK-f 105 will be described. First, the input data pieces 202 and 203 are coupled in this order to form a 1600-bit data block. Next, the 1600-bit data block is divided into units of sixty-four bit block to form twenty-five lanes. Last, the twenty-five lanes are arranged in the order illustrated in FIG. 2F along the x-y plane to build one state. The thus generated state structure is input to the round processing R 201. A method of forming the output data pieces 204 and 205 from an output data piece of the twenty-fourth round processing R 201 is similar, and thus the description thereof is not provided.

Next, five steps (steps θ, ρ, π, χ, and ι) included in the round processing R 201 will be described. In each of the steps, the data structure of an input data piece and an output data piece is the state structure.

FIG. 3A is a diagram illustrating processing in the step θ(θ processing unit 301). The step θ is processing of adding the sum of two columns to each bit, the two columns being adjacent to the bit. More specifically, the θ processing unit calculates each bit of the output state as follows. That is, the each bit is calculated as the sum of three values obtained from the input state: "a value of a bit at the same position"; "the sum of bits of a column at a position of −1 in the x axis direction"; and "the sum of bits of a column at a position of +1 in the x axis direction and −1 in the z axis direction". Here, the sum means the sum on GF(2), and the result will be the same as that of the exclusive OR operation. The processing can be expressed by the following expression.

$$a'[x][y][z] \leftarrow a[x][y][z] + \sum_{y'=0}^{4} a[x-1][y'][z] + \sum_{y'=0}^{4} a[x+1][y'][z-1]$$

In the expression, x is 0 to 4, y is 0 to 4, z is 0 to 63.

FIG. 3B is a diagram illustrating processing in the step θ upon calculation of a bit in an end part (x=0, for example). In order to calculate a bit at x=0, "a column at a position of −1 in the x axis direction" corresponds to a column opposite in the state, that is, "the column at a position of x=4". As described above, a coordinate beyond the state is regarded as a position that is opposite in the state. That is, coordinate values are cyclically shifted in the same state. This rule is similarly applied to x coordinate, y coordinate, and z coordinate and to four other steps.

FIGS. 4A, 4B, and 4C are diagrams illustrating processing in the step ρ (ρ processing unit 302). The step ρ is processing of shifting values of respective bits in the z axis direction. More specifically, the ρ processing unit 302 cyclically shifts values in each lane of the state in the z direction by the specified number of bits as illustrated in FIG. 4A and outputs the shifted values. The number of bits by which the values are shifted in each lane is previously determined as the number illustrated in FIG. 4B. Note that, in order to perform the ρ processing, a holding section previously holds a table listing shifting amounts as illustrated in FIG. 4C and the ρ processing unit 302 performs the ρ processing using the table being held.

FIGS. 5A and 5B are diagrams illustrating processing in the step π (π processing unit 303). The step π is processing of rearranging each of the respective bits in the x-y plane (also referred to as a "slice"), that is, processing of rearranging twenty-five lanes in a single state. More specifically, when respective lanes in the input state are numbered as illustrated in the upper part of FIG. 5A, the output state is illustrated in the lower part thereof. Note that, in order to perform the π processing, the holding section previously holds a table listing rearrangement destinations as illustrated in FIG. 5B and the π processing unit 303 performs the π processing using the table being held.

FIG. 6 is a diagram illustrating processing in the step χ (χ processing unit 304). The step χ is processing of converting a bit using bits in a line in the χ axis direction (also referred to as a "row"), and each bit in the output row is derived based on three bits in the same input row. More specifically, setting is made such that when a bit at a position of +1 in the x axis direction from each bit of the input row is zero and a bit at a position of +2 in the x axis direction from the bit is one, the χ processing unit 304 inverts the value of the each corresponding bit of the output row.

FIG. 7 is a diagram illustrating processing in the step ι (ι processing unit 305). The step ι is processing of adding a round constant to each bit. FIG. 8 is a diagram illustrating round constants used in the step ι. In the step ι, the ι processing unit 305 performs exclusive OR (XOR) on a bit line of a lane at x=y=0 with a round constant (64-bit value) predetermined for each round. More specifically, the ι processing unit 305 calculates bitwise exclusive OR of a 64-bit value of a lane at x=y=0 (when a bit at z=63 is MSB and a bit at z=0 is LSB) and a round constant illustrated in FIG. 8. Then, the ι processing unit 305 sets the result as a bit line of a lane at x=y=0 in the output state.

From the processing contents of the above respective steps (steps θ, ρ, π, χ, and ι), it can be understood that there are following limitations regarding start of the processing of the respective steps.

In the step θ, the θ processing unit 301 uses a sheet data piece at −1 and a sheet data piece at +1 in the x axis direction to calculate each lane in the state. Therefore, when the first three sheets are completed, that is, when the θ processing unit 301 receives twenty-three lanes out of the twenty-five lanes from a preceding stage, the θ processing unit 301 can start the processing in the step θ.

The step ρ is calculation for each of lanes independent of each other. Therefore, when one lane of calculation results of the preceding stage (step θ) is output, the ρ processing unit 302 can start the processing in the step ρ.

In the step π, respective lanes in a state are rearranged. Therefore, when one whole state of calculation results of the preceding stage (step ρ) is output, that is, when twenty-five lanes are output, the π processing unit 303 can start the processing in the step π.

In the step χ, in calculation of each lane in a state, the χ processing unit 304 uses a lane at +1 in the x axis direction and a lane at +2 in the x axis direction. Therefore, upon receiving three lane data pieces, the χ processing unit 304 can start the processing in the step χ.

The step ι is calculation for each of lanes independent of each other. Therefore, when one lane of calculation results of the preceding stage (step χ) is output, the ι processing unit 305 can start the processing in the step ι.

In other words, in the steps θ, π, and χ, start of processing has to wait until the steps at the respective preceding stages output calculation results of twenty-three lanes, twenty-five lanes, and three lanes respectively. As described above, particularly the processing of the two steps θ and π can be started when a long time has passed after the start of processing of their preceding stages.

This means that throughput can be improved when the starting time of the step θ or the step π can be hastened. However, the operation order of the specifications of the KECCAK algorithm does not allow improvement of throughput. Thus, the operation order has to be different from that of the KECCAK algorithm in order to improve throughput.

Next, round processing R' 901 will be described. The round processing R' 901 is processing used in the present exemplary embodiment and designed such that the result is the same as that of the round processing R 201. However, processing contents of the round processing R' 901 are different from the specifications of the KECCAK algorithm.

FIG. 9A is a diagram illustrating an overview of the round processing R' 901. The round processing R' 901 is designed such that the processing result is the same as that of the round processing R 201. In the round processing R' 901, processing of six steps is performed (by a θ1 processing unit 902, a π processing unit 903, a θ2 processing unit 904, a ρ' processing unit 905, a χ processing unit 906, and an ι processing unit 907) on an input data piece to generate an output data piece.

Note that, the π processing unit 903, the χ processing unit 906, and the ι processing unit 907 performs processing similar to those performed by the π processing unit 303, the χ processing unit 304, and the ι processing unit 305 of the round processing R 201. The ρ' processing unit 905 performs processing of shifting values of respective bits in the z axis direction similarly to the ρ processing unit 302 of the round processing R 201, but the number of bits by which the values are shifted is different. The θ1 processing unit 902 and the θ2 processing unit 904 are obtained by dividing the θ processing unit 301 in the round processing R 201.

Since the π processing, the χ processing, and the ι processing in the round processing R' 901 are similar to those in the round processing R 201, the description thereof is not provided. The ρ' processing, the θ1 processing, and the θ2 processing will be described below.

FIG. 10A is a diagram illustrating processing in the step ρ' (ρ' processing unit 905). In the step ρ', the ρ' processing unit 905 performs processing of cyclically shifting a value of each bit in the z axis direction similarly to the step ρ. However, the number of bits by which the values are cyclically shifted in each lane is different from that of the step ρ, and is illustrated in FIG. 10B. Note that, in order to perform the ρ' processing, a holding section previously holds a table listing shifting amounts as illustrated in FIG. 10C and the ρ' processing unit 905 performs the ρ' processing using the table being held. This table is determined in consideration of the π processing. The detail will be described below.

In order to describe that the processing result of the round processing R' 901 and that of the round processing R 201 are the same, first, there will be described that the processing result of the round processing R 201 and the processing result of round processing R" 911 are the same.

FIG. 9B is a diagram of the round processing R" 911. In the round processing R" 911, processing of five steps is performed (by a θ processing unit 912, a π processing unit 913, a ρ' processing unit 915, a χ processing unit 916, and an ι processing unit 917) on the input data piece to generate an output data piece. Here, the θ processing unit 912, the π processing unit 913, the χ processing unit 916, and the ι processing unit 917 are respectively similar to the θ processing unit 301, the π processing unit 303, the χ processing unit 304, and the ι processing unit 305 of the round processing R 201. The ρ' processing unit 915 is similar to the ρ' processing unit 905 of the round processing R' 901.

When the round processing R 201 is compared with the round processing R" 911, they are different in a point that the π processing unit 913 and the ρ' processing unit 915 perform the processing in this order in the round processing R" 911 while the ρ processing unit 302 and the π processing unit 303 perform the processing in this order in the round processing R 201.

Here, in the step ρ of the round processing R 201, the ρ processing unit 302 shifts values in the z axis direction according to rules determined for respective lanes, and the π processing unit 303 rearranges the respective lanes. On the other hand, in the round processing R" 911, the π processing unit 913 rearranges the respective lanes (processing in the step π), and thereafter the ρ' processing unit 915 shifts values in the z axis direction according to rules determined for the respective lanes in consideration of the rearrangement processing (processing in the step ρ'). More specifically, in the round processing R" 911, the step π is performed before the step ρ', but the shifting amount by which values are shifted in the z axis direction by the ρ' processing unit 915 is changed in consideration of the processing in the step π, whereby the processing result of the round processing R" 911 becomes the same as that of the round processing R 201.

FIG. 10C is a table listing shifting amounts for respective lanes used in the step ρ'.

A method of generating the table illustrated in FIG. 10C will be specifically described. First, the round processing R 201 will be considered. In the round processing R 201, the ρ processing unit 302 and the π processing unit 303 perform the processing in this order. The numbers in FIG. 4B are shifting amounts in the step ρ. For example, the shifting amount for a lane at the position of x=0 and y=4 is eighteen bits. Next, the lane rearrangement by the π processing is confirmed using FIGS. 5A and 5B. It can be seen that the π processing unit 303 moves the lane at the position of x=0 and y=4 to the position of x=4, y=2.

Next, the round processing R" 911 will be considered. In the round processing R" 911, the π processing unit 913 and the ρ' processing unit 915 perform the processing in this order. Since the π processing is performed before the ρ' processing, a lane for which the ρ' processing unit 915 should shift values by eighteen bits is a lane at the position of x=4, y=2. Therefore, the number at the position of x=4, y=2 in FIG. 10B is eighteen. Shifting amounts of the other lanes can be similarly obtained to be the other numbers in FIG. 10B.

That is, the table listing the shifting amounts for the respective lanes used in the step ρ' illustrated in FIG. 10C is a table determined in consideration of the rearrangement processing of the π processing.

Next, there will be described that the processing result of the round processing R" 911 is the same as that of the round processing R' 901.

Note that, the π processing unit 903, the ρ' processing unit 905, the χ processing unit 906, and the ι processing unit 907 respectively perform the processing similarly to the π processing unit 913, the ρ' processing unit 915, the χ processing unit 916, and the ι processing unit 917 of the round processing R" 911. The θ1 processing unit 902 and the θ2 processing unit 904 are obtained by dividing the θ processing unit 912.

When the round processing R" 911 is compared with the round processing R' 901, they are different in a point that the θ processing unit 912 and the π processing unit 913 perform the processing in this order in the round processing R" 911 while the θ1 processing unit 902, the π processing unit 903, and the θ2 processing unit 904 perform the processing in this order in the round processing R' 901.

Here, in the round processing R" 911, the step θ is a step of adding the sum of two columns to each bit, the two columns being adjacent to the bit, and the step π is a step of rearranging the respective lanes. On the other hand, in the round processing R' 901, the θ1 processing unit 902 calculates the sum of two columns that are adjacent to each bit (the step θ1). Then, the π processing unit 903 rearranges the respective lanes (the step π), and the θ2 processing unit 904 adds the sum of the columns to a bit in consideration of the rearrangement of the respective lanes (the step θ2).

FIG. 11 is a diagram illustrating processing in the step θ1. The step θ1 corresponds to the operation of the first half of the step θ and is a step of performing column sum calculation processing. More specifically, the processing is for calculating, for each column, the sum (to be referred to as θ mean value) of two values: "the sum of bits in a column at a position of −1 in the x axis direction" and "the sum of bits in a column at a position of +1 in the x axis direction and −1 in the z axis direction". After receiving twenty-five lane data pieces, the θ1 processing unit 902 outputs a θ intermediate value of one bit for each column that totals up to θ intermediate values of five times sixty-four bits. A structure for all of the θ intermediate values will be expressed as a planar structure that is parallel to the x-z plane and that has a width of five bits, a height of one bit, and a depth of sixty-four bits.

FIG. 12A is a diagram illustrating processing in the step θ2. The step θ2 corresponds to the operation of the second half of the step θ and is a step of performing column sum addition processing. That is, the step θ2 is a step of adding e intermediate values calculated in the step θ1 to the respective bits.

However, it should be noted that the step π has been already performed before the step θ2. More specifically, in the step θ of the round processing R" 911 (i.e., the step θ of the round processing R 201), an x coordinate of each bit and an x coordinate of a θ intermediate value used for calculation of the bit is the same. However, in the step θ2 of the round processing R' 901, an x coordinate of each bit and an x coordinate of a θ intermediate value used for calculation of the bit is different and the x coordinate is determined in consideration of the rearrangement of the respective lanes in the step π. The x coordinates of θ intermediate values used for calculation of respective bits are illustrated in FIG. 12B. Note that, a holding section previously holds a table in FIG. 12C providing x coordinates of θ intermediate values used for calculation of respective bits in the θ2 processing, and the θ2 processing unit 904 performs the θ2 processing using the table being held.

A method of generating the table illustrated in FIG. 12C will be specifically described. First, the round processing R'' 911 will be considered. The x coordinates of θ intermediate values needed to calculate respective bits in the step θ are the same as the x coordinates of the respective bits. For example, a bit at the position of x=0, y=4 is calculated using a θ intermediate value at the position of x=0 in the step θ. Next, the lane rearrangement in the step π is confirmed using FIGS. 5A and 5B. It can be seen that the π processing unit 913 moves the bit at the position of x=0, y=4 to the position of x=4, y=2.

Next, the round processing R' 901 will be considered. Since the π processing unit 903 has already performed the step n when the θ2 processing unit 904 performs the step θ2, it can be seen that an x coordinate of a θ intermediate value needed for calculation of a bit at the position of x=4, y=2 in the step θ2 is x=0. Therefore, a number at the position of x=4, y=2 out of the numbers provided in FIG. 12B becomes zero. The x coordinates of θ intermediate values for other bits can be similarly obtained to be the other numbers in FIG. 12B.

That is, the table in FIG. 12C providing the x coordinates of θ intermediate values when the θ2 processing unit 904 performs the step θ2 is a table determined in consideration of the rearrangement processing of the π processing.

As described above, the processing result of the round processing R 201 and that of the round processing R'' 911 are the same. In addition, the processing result of the round processing R'' 911 and the processing result of the round processing R' 901 are the same. Therefore, the processing result of the round processing R' 901 and the processing result of the round processing R 201 are the same.

From the processing contents of the above respective steps (steps θ1, θ2, and ρ'), it can be understood that there are following limitations regarding start of the processing of the respective steps.

In the step θ1, the θ1 processing unit 902 calculates the sum, and thus, the θ1 processing unit 902 updates a θ intermediate value in the process of calculation every time when each lane in the state is input. Therefore, when the preceding stage outputs calculation results of one lane data piece, the θ1 processing unit 902 can start the processing in the step θ1.

In the step θ2, the θ2 processing unit 904 adds a θ intermediate value calculated in the step θ1 in calculation of each lane in the state. Since the step θ1 has been completed at the time of starting the step θ2, the θ2 processing unit 904 can start to output the processing result of the step θ2 when the preceding stage (step π) outputs calculation results of one lane data piece.

The step ρ' is calculation for each of lanes independent of each other. Therefore, when the θ2 processing unit 904 outputs calculation results of the preceding stage (step θ2) of one lane data piece, the ρ' processing unit 905 can start the processing in the step ρ'.

That is, in the steps θ1, θ2, and ρ', processing can be started when one lane data piece out of calculation results of a step of the preceding stage is output.

In addition, from the processing contents of the steps π, χ, and ι, there are following limitations regarding start of the processing of the respective steps.

In the step π, respective lanes in a state are rearranged. Therefore, when the preceding stage (step θ1) outputs one whole state, that is, twenty-five lanes of calculation results of, the π processing unit 903 can start the processing in the step π.

In the step χ, in calculation of each lane in a state, the χ processing unit 906 uses a lane at +1 and a lane at +2 in the x axis direction. Therefore, upon receiving the third lane data piece, the χ processing unit 906 can start the processing in the step χ.

The step ι is calculation for each of lanes independent of each other. Therefore, when one lane of calculation results of the preceding stage (step χ) is output, the ι processing unit 907 can start the processing in the step ι.

In other words, in the step π, start of processing has to wait until the step of the preceding stage outputs twenty-five data pieces of calculation results. However, in the steps χ and ι, processing can be started when the steps of the preceding stages output three lane data pieces and one lane data piece out of calculation results respectively.

That is, in the steps excluding the step π, the processing can be started without waiting a long time after the start of processing of their preceding stages.

Thus, throughput can be improved by using the round processing R' 901 instead of the round processing R 201. Hereinafter, a configuration of the round processing R' 901 will be described.

FIG. 13 is a diagram illustrating a schematic configuration of an implementation example of the KECCAK algorithm according to the first exemplary embodiment. In FIG. 13, an input data piece 2101 is illustrated. Here, a lane data piece out of an input data piece 2101 is input as a unit. An exclusive OR (XOR) operator 2102 calculates exclusive OR of a message block and internal data each time of performing the round processing twenty-four times. A register 2103 holds the whole of the internal data expressed as a state data piece.

A circuit (θ1 circuit) 2104 performs processing in the step θ1. In the present exemplary embodiment, the circuit 2104 adds columns each time a lane is input and outputs θ intermediate values of five times sixty-four bits after receiving input of twenty-five lanes as a result.

A circuit (π circuit) 2105 performs processing in the step π. The π circuit 2105 performs the processing after the register 2103 holds twenty-five lanes, that is, one state. The data width upon input and output is 1600 bits.

A circuit (θ2 circuit) 2106 performs processing in the step θ2. A circuit (ρ' circuit) 2107 performs processing in the step ρ'. A circuit (χ circuit) 2108 performs processing in the step χ. A circuit (ι circuit) 2109 performs processing in the step ι. The θ2 circuit 2106, the ρ' circuit 2107, and the ι circuit 2109 respectively perform the processing in units of lanes, and thus perform the processing every time when a lane is input. The χ circuit 2108 performs the processing when three lanes are input, but the χ circuit 2108 performs every time when a lane is input from the fourth lane.

FIG. 14A is an output timing chart of the respective modules of the implementation example according to the first exemplary embodiment. FIG. 14A illustrates an output timing chart when the round processing R' 901 is performed twice. It takes on average twenty-eight clocks for one-time round processing.

Hereinafter, an implementation example in which processing is performed on a lane data piece as a unit by the algorithm according to the specifications will be described for comparison with the implementation example of the above first exemplary embodiment.

FIG. 15 is a diagram illustrating a schematic configuration of the implementation example when processing is performed on a lane as a unit by the KECCAK algorithm according to specifications. The processing of the five steps ($\theta$, $\rho$, $\pi$, $\chi$, and $\iota$) is similar to that described above, and thus the description thereof is not provided.

The KECCAK-f 105 receives one lane data piece (data having a length of sixty-four bits) from an input data piece 1801 at every clock. The KECCAK-f 105 receives lane data pieces in one state data piece in the order illustrated in FIG. 2F.

An Exclusive OR processing unit 1802 is an operator that calculates exclusive OR of a message block and an internal data piece upon each time of performing the round processing twenty-four times.

A register 1803 holds the whole of the internal data expressed as a state data piece. A processing block ($\pi$ circuit) 1804 performs the step $\pi$. However, as described above, the processing in the step $\pi$ can be performed only after the processing in the step $\rho$ is completed. A processing block ($\theta$ circuit) 1805 performs the step $\theta$, and a processing block ($\rho$ circuit) 1806 performs the step $\rho$.

A processing block ($\chi$ circuit) 1807 performs the step $\chi$, and a processing block ($\iota$ circuit) 1808 performs the step $\iota$. A multiplexer 1809 outputs data having been input from the processing block 1806 in the first half of round processing and outputs data from the processing block 1808 in the second half thereof. The KECCAK-f outputs an output data piece 1810 of one lane when calculation is completed.

FIG. 14B is an output timing chart of the respective modules when processing is performed on a lane as a unit by the algorithm according to specifications. A pair of the $\theta$ circuit 1805 and the $\rho$ circuit 1806 and a pair of the $\chi$ circuit 1807 and the $\iota$ circuit 1808 operate in different time-periods and do not operate at the same time. It takes fifty-one clocks for one-time round processing.

As can be seen from comparison of FIG. 14A and FIG. 14B, throughput of the processing can be improved by using the configuration of the implementation example according to the first exemplary embodiment.

More specifically, the followings can be said.

All processing circuits other than the $\pi$ circuit 2404 operate in parallel, and thus utilization efficiency of the circuits can be improved.

One-time round processing can be performed within a smaller number of clocks (less time).

As described above, the $\pi$ processing is performed before the $\theta 2$ processing and the $\rho$ processing are performed, and data is held for the $\pi$ processing during the $\theta 1$ processing is performed. Thus, time for holding data similarly to the conventional technique is reduced. Incidentally, FIG. 13 illustrates an example in which the $\rho$ processing performed after the $\theta 2$ processing, but similar effect can be obtained even when the $\rho$ processing is performed before the $\theta 2$ processing is performed. When the $\rho$ processing is performed before the $\theta 2$ processing, bits to be added in the $\theta 2$ processing should be determined in consideration of the fact that the $\rho$ processing has been performed.

According to the exemplary embodiments described above, a technique capable of improving throughput for generating hash values can be provided.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment (s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-032036 filed Feb. 21, 2013 and No. 2014-017414 filed Jan. 31, 2014, which are hereby incorporated by reference herein in their entirety.

The invention claimed is:

1. A hash value generating device comprising:
   a $\theta$ processor operating to perform $\theta$ processing included in round processing of Secure Hash Algorithm 3 (SHA-3 algorithm);
   a $\rho$ processor operating to perform $\rho$ processing included in the round processing;
   a $\pi$ processor operating to perform $\pi$ processing included in the round processing;
   a $\chi$ processor operating to perform $\chi$ processing included in the round processing; and
   an $\iota$ processor operating to perform $\iota$ processing included in the round processing,
   wherein the $\theta$ processor includes a $\theta 1$ processor operating to calculate column sum and a $\theta 2$ processor operating to add the calculated column sum to a predetermined bit, and
   wherein, in the round processing, the $\pi$ processor performs processing before the $\theta 2$ processor and the $\rho$ processor perform processing and after the $\theta$ processor performs processing.

2. The hash value generating device according to claim 1, wherein the $\pi$ processor performs processing after a holding register holds twenty-five lanes.

3. The hash value generating device according to claim 2, wherein the $\theta 1$ processor performs processing during a period in which the holding register holds lanes.

4. The hash value generating device according to claim 1, wherein the $\theta 2$ processor performs processing using a table determined in consideration of processing by the $\pi$ processor.

5. The hash value generating device according to claim 1, wherein the ρ processor performs processing using a table determined in consideration of processing of by π processor.

6. The hash value generating device according to claim 1, wherein the θ1 processor, the θ2 processor, the ρ processor, the χ processor, and the ι processor perform processing in units of lanes.

7. The hash value generating device according to claim 1, further comprising at least one processor operating to output a hash value obtained by performing the round processing using the θ processor, the ρ processor, the π processor, the χ processor, and the ι processor.

8. The hash value generating device according to claim 1, wherein the θ processor calculates a sum of bits along an x axis direction and adds the calculated sum to a predetermined bit,
wherein the ρ processor shifts values of respective bits in a z axis direction,
wherein the π processor rearranges values of respective bits in an x-y plane,
wherein the χ processor converts a bit using bits in a line in the x axis direction, and
wherein the ι processor adds predetermined values to respective bits.

9. A hash value generating device that performs round processing of hash algorithm in which a data piece of a structure having m bits in an x axis direction, n bits in a y axis direction, and s bits in a z axis direction is processed, the hash value generating device comprising:
a first processor operating to calculate a sum of bits in the x axis direction and adding the calculated sum to a predetermined bit;
a second processor operating to shift a bit in the z axis direction;
a third processor operating to rearrange respective bits in an x-y plane;
a fourth processor operating to convert a bit using bits in a line in the x axis direction; and
a fifth processor operating to add predetermined values to respective bits,
wherein the first processor includes a sixth processor operating to calculate the sum of the bits in the x axis direction and a seventh processor operating to add the calculated sum to the predetermined bit, and
wherein, in the round processing, the third processor performs processing before the seventh processor and the second processor perform processing and after the sixth processor performs processing.

10. The hash value generating device according to claim 9, wherein the third processor performs processing after a holding register holds twenty-five data pieces of a structure having one bit in the x axis direction, n bits in the y axis direction, and one bit in the z axis direction.

11. The hash value generating device according to claim 10, wherein the sixth processor performs processing during a period in which the holding register holds data of a structure having one bit in the x axis direction, n bits in the y axis direction, and one bit in the z axis direction.

12. The hash value generating device according to claim 9, wherein the seventh processor performs processing using a table determined in consideration of processing by the third processor.

13. The hash value generating device according to claim 9, wherein the second processor performs processing using a table determined in consideration of processing by the third processor.

14. The hash value generating device according to claim 9, further comprising at least one additional processor configured to output a hash value obtained by performing the round processing using the first processor, the second processor, the third processor, the fourth processor, and the fifth processor.

* * * * *